United States Patent
Cook, Jr.

[15] 3,635,628
[45] Jan. 18, 1972

[54] PURGING GUARD FOR PLASTICS INJECTION-MOLDING MACHINES

[72] Inventor: Francis W. Cook, Jr., Newington, Conn.
[73] Assignee: The New Britain Machine Company, New Britain, Conn.
[22] Filed: Mar. 19, 1969
[21] Appl. No.: 808,417

[52] U.S. Cl. ........................................... 425/151, 425/242
[51] Int. Cl. .................................................. B29f 1/03
[58] Field of Search ........... 18/30 CS, 30 NM, 30 LD, 30 LK, 18/30 LV, 30 I, 30 LA, 30 NT, 30 D, 30 LM, 30 NV, 30 JA, DIG. 45, 12 DH; 222/556

[56] References Cited

UNITED STATES PATENTS 2,901,148  8/1959  Cunningham et al. ................. 222/556
3,257,039  6/1966  Trutza ................................. 222/556

FOREIGN PATENTS OR APPLICATIONS 6,500,281  7/1965  Netherlands ......................... 425/242

*Primary Examiner*—H. A. Kilby, Jr.
*Attorney*—Robert S. Smith, David S. Urey, Alan C. Rose and Alfred B. Levine

[57] ABSTRACT

In a plastics injection-molding machine, wherein injection mechanism is reciprocated into and out of a mold-injection position, the invention provides a protective guard which is movable, as by pivot action, into and out of the path of the nozzle of the injector mechanism. The reciprocation of the injector and the movement of the guard are coordinated so as to place the guard in front of the nozzle when the injector is retracted from molding position.

7 Claims, 5 Drawing Figures

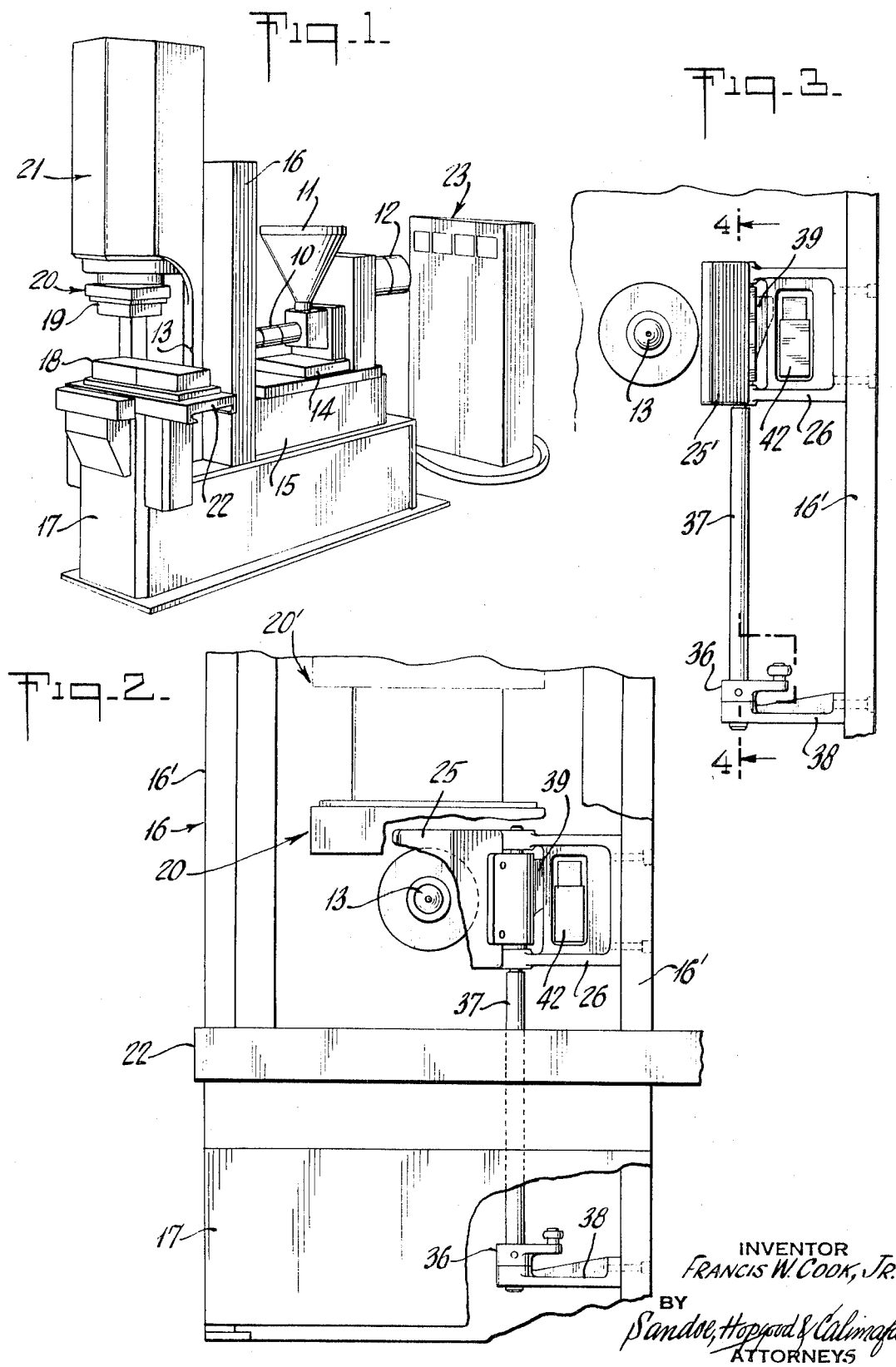

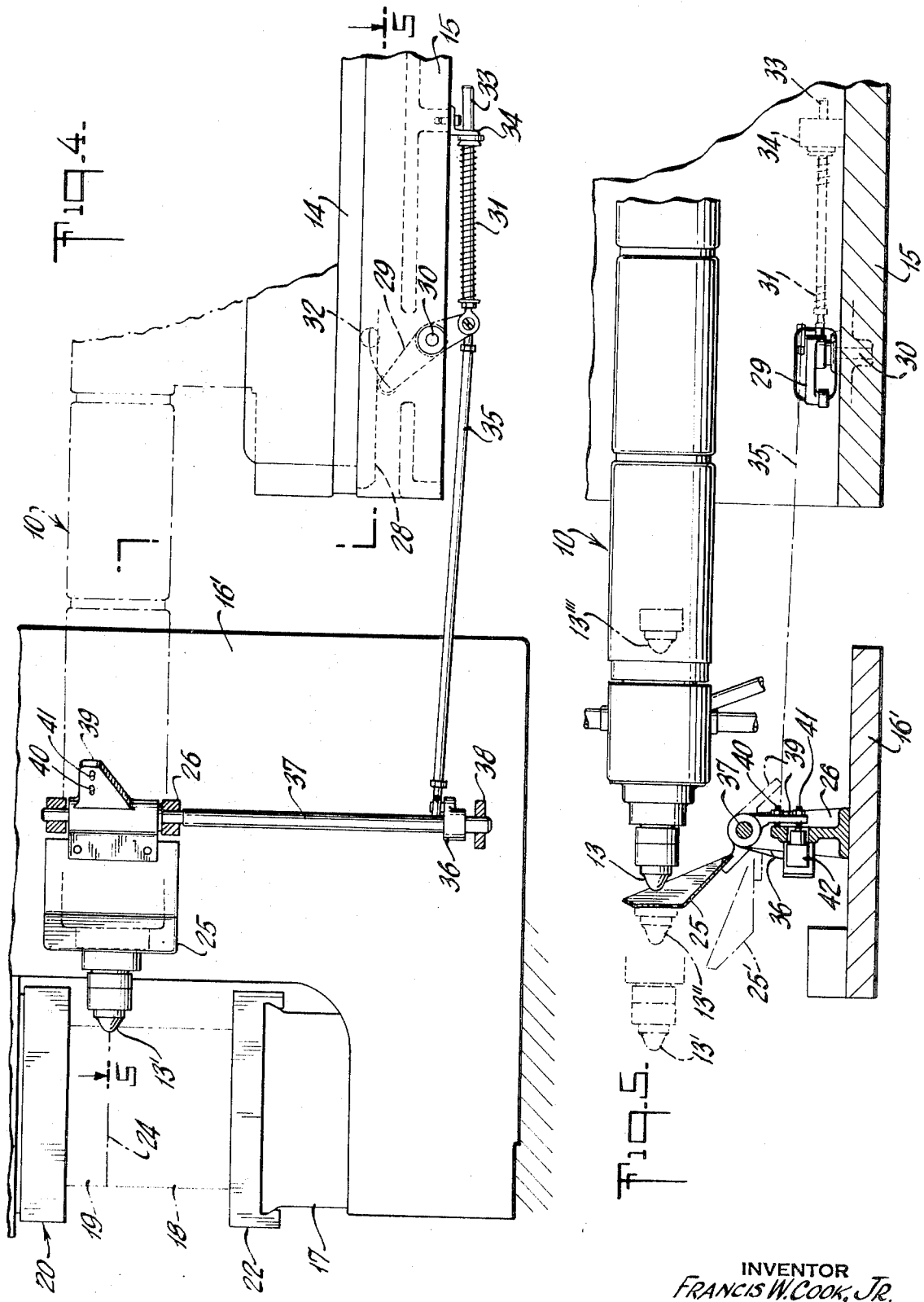

PURGING GUARD FOR PLASTICS INJECTION-MOLDING MACHINES

For the pivoted form that is disclosed, the guard and part of its actuating mechanism are mounted on the machine frame. The actuating mechanism involves cam and follower elements, one of which is carried by the reciprocated injector and the other of which is connected to the guard. The cam and follower elements are resiliently loading into tracking contact, in a relationship such that even when the guard has been actuated into nozzle-blocking position, i.e., at the retracted position of the injector, the guard may be manually or otherwise moved out of nozzle-blocking position, as for specific setup or servicing purposes.

PURGING GUARD FOR PLASTICS INJECTION-MOULDING MACHINES

The present invention relates to safety mechanism in plastics injection-molding machines. In particular, the invention provides a guard for protecting the machine operator and others in the vicinity from molding composition ejected from the injection nozzle of the machine under high pressure when the injector is in retracted position, as when the injector is being purged of molding composition.

In plastics injection-molding machines, a "melt" of plasticized material is accumulated under high pressure in injection mechanism having a suitable chamber and an injection nozzle. The injection mechanism is reciprocated on the machine frame between a molding position and a retracted position. In the molding position, high-pressure "melt" is discharged from the nozzle into the sprue of a mold, and in the retracted position the nozzle is removed from communication with the mold; ejection pressures customarily range from about 12,000 to about 32,000 p.s.i. Depending upon the particular machine configuration and plastics material utilized, the nozzle may or may not embody valve mechanism for control of its discharge. But, in any event, the "melt" may be retained under high pressure in readiness for a "shot" discharge, and even after a discharge there may remain a residuum of high-pressure "melt" which would ordinarily be part of the next "shot," on recycling use of the machine. If, through accident, a discharge should take place when the injector is not in molding position, the consequences are hazardous, particularly to personnel; such hazard regularly presents itself when the injection mechanism must be purged of melt, after completion of a run or when shutdown is otherwise necessary.

Accordingly, it is an object of the invention to provide safety mechanism for substantially reducing the indicated hazard.

A specific object is to provide a guard member which is automatically interposed in the ejection path of plastic from the injector of an injection-molding machine, when the injector is in retracted position.

Another specific object is to provide a guard member of the character indicated which, when it is interposed in said ejection path, is resiliently supported so as to make possible relatively simple retraction of the guard member, should that be necessary when the injector is retracted or when the nozzle and injector are advanced from full-retracted to a forward position.

A general object is to achieve the foregoing objects with relatively simple mechanism, readily adaptable to a variety of kinds of injection-molding machines, with minimum machine modification.

Further objects, advantages and features of the present invention will be apparent from the following detailed description, in conjunction with the accompanying drawings. In said drawings, which show, for illustrative purposes only, a preferred form of the invention:

FIG. 1 is a perspective view of a plastics injection-molding machine incorporating a guard means of the invention;

FIG. 2 is a fragmentary front elevation view of the machine of FIG. 1, illustrating the position of the guard means in relation to the other elements of the machine;

FIG. 3 is a front view of the guard means and part of its operating mechanism, showing the guard moved out of the ejection path from the nozzle of the injector, i.e., when the injector is in molding position;

FIG. 4 is a side view, from the right side of FIG. 1, showing the guard means and its operating mechanism, part of the guard support being shown in section along the line 4—4 of FIG. 3; and FIG. 5 is a simplified top view of the guard means and some of its operating mechanism, showing the guard in its alternative positions relative to the injector of the molding machine, certain parts being sectioned generally along the line 5—5 of FIG. 4.

Briefly stated, the invention contemplates a plastics injection-molding machine in which a protective guard is movable, as by pivot action, into and out of the path of the nozzle of the injector mechanism. The reciprocation of of the injector and the movement of the guard are coordinated so as to place the guard in front of the nozzle when the injector is retracted from molding position.

For the pivoted form that is disclosed, the guard and part of its actuating mechanism are mounted on the machine frame. The actuating mechanism involves cam and follower elements, one of which is carried by the reciprocated injector and the other of which is connected to the guard. The cam and follower elements are resiliently loading into tracking contact, in a relationship such that even when the guard has been actuated into nozzle-blocking position, i.e., at the retracted position of the injector, the guard may be manually or otherwise moved out of nozzle-blocking position, as for specific setup or servicing purposes.

Referring in particular to FIG. 1, of the drawings, the invention is shown in application to a plastics injection-molding machine of the so-called reciprocating-screw variety. In the machine shown, an elongated horizontal plasticizing chamber 10 contains the screw (not shown) which is fed from a hopper 11 at its rear end. Drive mechanism including a motor 12 rotates the screw to both plasticize and forwardly feed the material available from hopper 11. Upon accumulation of sufficient melt at the forward end of chamber 10, discharge is effected to the mold through a suitable nozzle 13 identified in the other figures. The entire described plasticizing mechanism, including the injection nozzle, will be referred to as the injector, and is suitably mounted, as on a carriage 14, which is guided for horizontal reciprocation on the base or frame 15 of the machine.

Feed mechanism (not shown) actuates the horizontal reciprocation of the injector. Normally, this involves a forward or molding position wherein the nozzle 13 is coupled for discharge of plasticized melt into the sprue of a given mold, and a partially retracted position in which the nozzle 13 is separated from the mold. For setup or shutdown or other purposes, the injector carriage can be even further retracted, i.e., rearwardly of the retracted position to which it is reciprocated in the normal recycling involved in automatic operation of the machine. Various of these positions are indicated in FIG. 5, wherein 13' designates the full-forward or molding position of the injector nozzle, wherein 13" designates normal retraction in the course of automated recycling for molded-part production, and wherein 13''' designates the further retracted or shutdown position.

Most injection-molding machines of the character indicated incorporate mold-support and clamp structure wherein the displacement involved in separating the mold parts, as for extraction of molded products, is generally axial, in terms of the injection axis. However, in the machine shown the mold-clamp action is perpendicular to the injector axis. Specifically, the mold-clamp action is vertical and comprises upstanding frame structure 16 and a table 17 connected to and forming the part of the frame 15. Table 17 supports a lower mold part 18, and an upper mold part 19 is carried by an upper mold support, forming part of a clamp slide 20 which is guided for vertical reciprocation on the upright frame 16. Clamp-actuating mechanism is carried at 21, for moving the upper mold part 19 between its lower or molding position (FIG. 4) and its retracted upper or mold-open position (FIG. 1).

The machine illustrated happens to be a high-production embodiment wherein the lower mold part 18 is provided in duplicate, and the upper mold part 19 is actuated to coact in alternation with two lower mold parts 18—18'. Thus, the duplicate lower mold parts 18—18' are mounted side-by-side on a shuttle carriage 22, which in turn is supported on horizontal ways or guide means on table 17, the shuttle axis being transverse to the injection axis. It will be understood that shuttle actuating means (not shown) reciprocates carriage 22, alternately to the left and to the right, for injection cycles in which mold parts 18–19 coact, in alternation with injection cycles in which mold parts 18'–19 coact. Such reciprocation, and the reciprocation cycles of the movable clamp support 20 and of injector 10, will be understood to be programmed and synchronized by suitable monitoring and control means suggested at 23.

Whichever lower mold element 18 or 18' is used, i.e., for any single "shot," the injection from nozzle 13 may be aligned with a mold sprue on the parting line 24 (FIG. 4) between the upper and lower mold parts; and for normal injector reciprocation into and out of this relation, it will be understood that the forwardly projecting body of the injector is freely accommodated in the space between two pedestals 16', as shown in FIG. 2.

As explained, normal production runs of the machine involve injector reciprocation between the "molding" and "retracted" positions suggested at 13' and 13" in FIG. 5. However, when the machine is being set up, or when the machine is being purged of unused remainder of plasticized melt, the injector 10 is withdrawn rearwardly of the "production"-retraction position 13". It is preferably during retraction rearwardly of the "production"-retraction position 13" that the protective device of the invention is operative.

The protective device involves a movable guard member 25, shown pivoted to the frame, by way of a bracket 26. A system of cranks and connecting rods link guard 25 to cam-actuated means which tracks the instantaneous position of injector carriage 14, along its horizontal path of movement. In the form shown, a cam element 28 (see FIG. 4) is secured to the underside of the injector carriage 14, and the cam follower is a roller at one end of a rocker arm 29, pivoted at 30 to the frame 15 and resiliently urged by means 31 into tracking relation with cam 28. In FIG. 4, follower 29 has been displaced by cam 28 to its full extent (counterclockwise), and the guard member 25 is swung out of the way of the injector and its nozzle 13 (phantom outline 25' in FIG. 5), so that production may proceed. However, when injector 10 is retracted further than the "production"-retraction position 13", follower 29 runs off the left end of cam 28; whereupon, spring 31 displaces follower 29 in the clockwise direction (to the position suggested at 32 for the follower roll), and guard member 25 swings into the safety or blocking position shown in full in FIG. 5. The spacing between nozzle positions 13 and 13'" in FIG. 5 suggests the relatively extensive range of injector displacement that is thus protected by the guard member 25.

In the form shown, the cam-tracking linkage, by which guard member 25 is actuated, includes a rod 33 pinned to the lower end of follower 29 and loosely guided near its other end in a frame-mounted bracket 34; rod 33 supports spring 31 for frame reference at bracket 34. Another rod 35 links the lower end of follower 29 to a crank 36 which is secured to the same pivot shaft 37 as is the guard member 25. To provide least clutter in the working area between uprights 16', the crank 36 is positioned below this working area and adjacent a second bracket 38, beneath the bracket 26. For precise determination of the nozzle-blocking guard position of FIG. 5, a stop arm 39 is formed as part of or is carried by the pivoted purge member 25, for limiting abutment with the upstanding web of bracket 26, being urged to this position by spring 31 (unless retracted by cam 28); a set screw 40 permits a degree of adjustment of such positioning. In addition, a second set screw 41 carried by arm 39 is poised to intercept and actuate probe means 42, such as a limit switch, carried by bracket 26 and forming an interlock function in the overall control of machine operation, as will be understood; for example, means 42 may be interlocked with manually operated purge-initiation means (not shown), so that the guard is assuredly in place whenever purging occurs.

As noted above, the direction of resiliently loaded cam-tracking action is such as to rely on such loading to determine the nozzle-blocking position (FIG. 5); the retracted position of the guard is always determined by direct cam-driven action. This relationship leaves no room for failure of the guard to retract (and to stay retracted) when the machine is set for automated recycling, in a production run. Moreover, this relation also means that spring 31 performs the function of resiliently absorbing the impact of plastic melt that is discharged to purge the injector. Additionally, this relation provides the convenience of manual or other displacement of guard 25 out of nozzle-blocking position, even when the injector is fully retracted, should it be necessary to gain greater access to the working area between frames 16' when setting up the machine.

In view of the fact that pivot axes for rocker arm 29 and for crank 36 are substantially perpendicular, I prefer that connections of these members to the ends of rod 35 shall be of the so-called self-aligning variety, thus providing maximum freedom of adaptability to the compound angularity effects resulting from both lever systems. This type connection, particularly when link 35 is oriented substantially parallel to the injector axis, is also especially useful in machines as described in my copending application, Ser. No. 824,845, filed May 15, 1969, wherein the entire frame and guide system for the injector mechanism may be selectively elevated in order to adapt the injector nozzle for mold coaction within a range of mold-sprue elevations.

It will be seen that I have described safety mechanism meeting the foregoing objectives and also facilitating the purging of the injector after a production run. By cupping the guard member 25 as shown, the splashing of ejected high-temperature melt is minimized and, at the same time, discharged melt is more readily contained and compacted into a predominant single mass, for neater disposition.

Although the invention has been described for the preferred form and machine shown, it will be understood that modifications and employment in conjunction with other types of machines are within the scope of the invention as defined in the claims.

What is claimed is:

1. In combination in a plastics injection-molding machine which includes an injector having a nozzle for periodically ejecting discrete masses of plastic molding composition under pressure from its nozzle with the injector being mounted to slide on a platform between a molding position, wherein the nozzle is in position to eject said composition into the sprue hole of a mold on the machine, and a retracted position wherein the nozzle is out of molding position, a retractable guard plate pivotally mounted on the platform in position to be pivoted into the path of composition ejected from the injector nozzle when the injector is moved into said retracted position, and out of said path when the injector is moved to said molding position, and means for pivoting the guard plate into and out of said path when the injector is moved respectively to said retracted position and to said molding position, said last mentioned means comprising a cam and a follower.

2. The combination of claim 1, in which said means for pivoting the guard plate comprises a rod connected at one end to the guard for pivoting the guard plate by longitudinal movement of the rod, a lever pivotally mounted on the platform pivotally connected to the rod for moving the rod longitudinally by pivotal movement of the lever, and means on the platform engaging the lever and pivoting the lever to pivot the guard plate into said path when the injector is moved to retracted position and to pivot the guard plate out of said path when the injector is moved to molding position.

3. The combination of claim 1, in which said means for pivoting the guard plate comprises a lever pivotally mounted on the platform and connected to the guard plate for pivoting the guard plate into and out of said path by pivotal movement of the lever, said injector having an elongated surface aligned to more relatively past the lever as the injector slides from one of its said positions to the other, said lever having a free end adapted to engage and ride on said surface, said surface having a shoulder at one end in position to be engaged by said free end of the lever to cause the lever to pivot in a direction to pivot the guard plate out of said path as the injector slides to said molding position, and means for resiliently urging the lever to pivot the free end of the lever into engagement with said surface.

4. The combination of claim 3, in which said shoulder is an end edge of said surface extending inward from the surface relative to the direction in which the lever pivots for pivoting the guard into said path, said edge being at the end portion of the surface to be engaged by the free end of the lever as the injector reaches said retracted position, said lever engaging said surface at an acute angle in the direction opposite the relative direction in which the injector moves toward said retracted position and being biased by said resilient means to swing its free end resiliently against said edge when the injector reaches said retracted position whereby the lever is adapted to swing its free end away from said edge against the pressure of the resilient means for absorbing the impact on the guard plate of a mass of said composition ejected from the ejector when the guard plate is in the path of the ejected composition.

5. In combination in a plastics injection-molding machine, a frame, an injector including a nozzle and means for periodically ejecting discrete masses of plasticized molding composition under pressure from said nozzle, guard means on said frame and supporting said injector for longitudinal reciprocation between a molding position and a retracted position wherein said nozzle is out of molding position, molding means supported by said frame and including a reciprocable movable element having a molding position wherein said nozzle in its molding position is aligned and in plastics-injecting relation with said molding means, said element of said molding means having a retracted position in which the ejection axis of said nozzle is out of alignment with said movable element, actuating means including means synchronizing reciprocations of said injector means and of said movable molding element into and out of plastics-injecting relation, said last-mentioned means comprising a cam and a follower, and a guard member movably carried by said frame and having a first position intermediate said nozzle and said molding means when said injector is in retracted position, said guard member having a second position in which it is retracted out of the path of injector movement when the latter moves into molding position.

6. The combination of claim 5, in which the reciprocating displacement of said injector during operation by said actuating means utilizes a first retracted position short of the maximum possible retracted position of said injector, and in which said guide member is movable into its first position only for injector displacement which is further retracted than said first retracted position.

7. In combination in a plastics injection-molding machine which includes a frame and an injector having a nozzle for periodically ejecting discrete masses of plastic-molding composition under pressure from its nozzle, guide means on said frame and supporting said injector for reciprocating displacement between a molding position, wherein the nozzle is in position to eject said composition into the sprue hole of a mold on the machine, and a retracted position wherein the nozzle is out of molding position, a guard member movably carried by said frame and having a first position in the nozzle discharge path when the injector is moved to said retracted position, said guard member having a second position out of said path when the injector is moved to said molding position, and actuating means for moving said guard member and including a member tracking the instantaneous position of said injector on said frame.

* * * * *